(12) United States Patent
Pearson

(10) Patent No.: US 8,998,159 B2
(45) Date of Patent: Apr. 7, 2015

(54) LOCKING SYSTEM FOR ADJUSTABLE TELESCOPIC PROPS

(71) Applicant: John Henry Pearson, London (GB)

(72) Inventor: John Henry Pearson, London (GB)

( * ) Notice: Subject to any disclaimer, the term of this patent is extended or adjusted under 35 U.S.C. 154(b) by 0 days.

(21) Appl. No.: 13/758,046

(22) Filed: Feb. 4, 2013

(65) Prior Publication Data

US 2013/0206948 A1  Aug. 15, 2013

Related U.S. Application Data

(63) Continuation of application No. PCT/GB2011/001178, filed on Aug. 5, 2011.

(30) Foreign Application Priority Data

Aug. 5, 2010 (GB) .................................. 1013178.7
Jun. 28, 2011 (GB) .................................. 1111009.5

(51) Int. Cl.
| | | |
|---|---|---|
| *A47F 5/00* | (2006.01) | |
| *E04G 25/00* | (2006.01) | |
| *F16M 13/00* | (2006.01) | |
| *E04G 25/06* | (2006.01) | |
| *F16B 41/00* | (2006.01) | |

(52) U.S. Cl.
CPC .............. *E04G 25/06* (2013.01); *F16B 41/005* (2013.01)

(58) Field of Classification Search
CPC ................................ E04G 25/00; E04G 25/06
USPC ............ 248/354.1, 354.3, 354.4, 354.7, 551, 248/230.1, 230.6, 231.71; 52/118, 632; 470/43

See application file for complete search history.

(56) References Cited

U.S. PATENT DOCUMENTS

| | | | | |
|---|---|---|---|---|
| 1,073,294 A | * | 9/1913 | Siewert | .......................... 254/103 |
| 1,893,986 A | * | 1/1933 | Dreyfuss | .......................... 254/98 |
| 3,815,434 A | | 6/1974 | Seger | |
| 3,822,850 A | * | 7/1974 | Elias | ............................. 248/551 |

(Continued)

FOREIGN PATENT DOCUMENTS

| | | |
|---|---|---|
| DE | 3903034 | 8/1989 |
| DE | 20019577 | 3/2001 |

(Continued)

OTHER PUBLICATIONS

International Search Report in priority International Application No. PCT/GB2011/001178, mailed Nov. 21, 2011.

(Continued)

*Primary Examiner* — Terrell McKinnon
*Assistant Examiner* — Michael McDuffie
(74) *Attorney, Agent, or Firm* — Marvin A. Motsenbocker; MOTS Law, PLLC

(57) ABSTRACT

A locking device for preventing unauthorized retraction of a telescopic prop is made up of an adjustable clamp which can be fitted round the outer circumference of the prop together with a fastener for tightening the clamp, such as a nut and bolt with anti-tamper heads and a shield to prevent access to the head with a gripping instrument. The device can be placed around the outer circumference of an extended prop adjacent to the collar such that once the clamp is tightened the collar is sandwiched between the locking device and the pin. Alternatively the device can be placed around the outer circumference of the inner tube of the prop adjacent to and abutting the end of the outer tube of the prop in order to prevent unauthorized retraction of the prop.

14 Claims, 4 Drawing Sheets

(56) References Cited

U.S. PATENT DOCUMENTS

| | | | |
|---|---|---|---|
| 4,611,379 A * | 9/1986 | Heitzman | 29/426.5 |
| 4,664,000 A | 5/1987 | Bainbridge | |
| 4,732,517 A * | 3/1988 | Crouch et al. | 411/39 |
| 4,791,535 A * | 12/1988 | Sclafani et al. | 362/543 |
| 5,015,125 A * | 5/1991 | Seegmiller | 405/288 |
| 5,590,863 A * | 1/1997 | Sasaki | 248/354.3 |
| 5,758,854 A * | 6/1998 | Shih | 248/354.3 |
| 5,791,848 A | 8/1998 | Lanham | |
| 5,808,217 A * | 9/1998 | Liao | 84/422.3 |
| 5,904,383 A * | 5/1999 | van der Wal | 292/307 B |
| 6,364,270 B1 * | 4/2002 | Kamei | 248/354.1 |
| 6,379,085 B1 * | 4/2002 | Vanderklaauw | 405/230 |
| 7,134,810 B2 * | 11/2006 | Stankus et al. | 405/288 |
| 7,334,968 B2 * | 2/2008 | Stankus et al. | 405/288 |
| 7,699,276 B2 * | 4/2010 | Melic | 248/200.1 |
| 8,002,229 B2 * | 8/2011 | Hewson | 248/410 |
| 8,051,690 B2 * | 11/2011 | Camisasca | 70/232 |
| 8,052,110 B2 * | 11/2011 | Wang | 248/354.3 |
| 8,052,352 B2 * | 11/2011 | Bolton et al. | 405/290 |
| 2006/0278783 A1 * | 12/2006 | Rubin | 248/230.1 |

FOREIGN PATENT DOCUMENTS

| | | |
|---|---|---|
| EP | 0245704 | 11/1987 |
| GB | 483717 | 4/1938 |
| JP | 7310443 | 11/1995 |
| WO | 2005024254 | 3/2005 |

OTHER PUBLICATIONS

Search Report in priority Great Britain Application No. GB1111009.5, dated Jul. 22, 2011.

* cited by examiner

LOCKING SYSTEM FOR ADJUSTABLE TELESCOPIC PROPS

CROSS REFERENCE TO RELATED APPLICATIONS

This application is a continuation of International Application No. PCT/GB2011/001178, filed on Aug. 5, 2011, entitled "Locking System for Adjustable Telescopic Props," which claims priority under 35 U.S.C. §119 to Application No. GB 1013178.7 filed on Aug. 5, 2010, and GB 1111009.5 filed on Jun. 28, 2011, the entire contents of each of which are hereby incorporated by reference.

FIELD OF THE INVENTION

The present invention relates to a locking system for adjustable telescopic props. Adjustable telescopic props are used mainly in the construction industry for supporting walls and roofs, although they can find use elsewhere, for example in boatyards to support boats while out of the water.

BACKGROUND

Generally speaking an adjustable telescopic prop consists of two concentric tubes; an outer tube and an inner tube. The inner tube can slide telescopically within the outer tube in order to adjust the overall length of the prop. The outer tube is normally provided with opposing longitudinal slots and the inner tube is normally provided with a corresponding series of pairs of opposing holes along its length. In use the inner and outer tubes are telescoped to approximately the right length and a pin is placed through the slots and holes that line up with the slot. Fine adjustment is then made to extend the prop to the correct length by means of a collar with a thread on its inner surface which engages with a thread on the outer surface of the outer tube. Turning the collar moves it longitudinally along the outer tube. The collar abuts the pin so that movement along the outer tube can urge the pin along in order to extend the inner tube and thereby lengthen the prop.

To undo the prop once it is no longer required the collar is unscrewed and the pin removed, the inner tube is then retracted into the outer tube.

SUMMARY

Against this background the invention provides a locking device for preventing unauthorized retraction of an telescopic prop, the device comprising an adjustable clamp which can be fitted round the outer circumference of the prop, a fastener for tightening the clamp, the fastener comprising an anti-tamper head and a shield to prevent access to the head with a gripping instrument.

The locking device according to the invention can be placed around the outer circumference of an extended prop adjacent to the collar such that once the clamp is tightened the collar is sandwiched between the locking device and the pin. Alternatively the device can be placed around the outer circumference of the inner tube of the prop adjacent to and abutting the end of the outer tube of the prop. In either case, the prop is prevented from being retracted without first removing the locking device. Since the fastener of the device comprises an anti-tamper head, it can only be undone with a corresponding anti-tamper key. It is intended that the key for the anti-tamper head would be kept by an authorized person, for example the foreman of a construction site or manager of a boatyard. Accordingly, once the locking device of the present invention is fitted to an adjustable telescopic prop, unauthorized retraction is prevented. Accordingly, the prop cannot be taken down by vandals, or accidentally taken down before work has been completed without authorization. The shield prevents access to the anti-tamper head of the fastener with a gripping instrument, such as a pair of pliers, which could potentially be used to undo even a locking head.

Preferably the clamp of the device is adapted to fit round the outer circumference of the outer tube of a standard adjustable telescopic prop. Alternatively the device is adapted to fit around the outer circumference of the inner tube of an adjustable telescopic prop. More preferably still, the clamp is adapted to be adjustable to fit around and tighten onto both the inner and outer tubes of a prop. Accordingly preferably the inner diameter of the clamp in an open position is at least 40 mm and the inner diameter of the clamp in the tightened position is less than 60 mm. More preferably the inner diameter of the clamp in an open position is at least 50 mm and the inner diameter of the clamp in the tightened position is less than 50 mm and more preferably still the inner diameter of the clamp in an open position is at least 60 mm and the inner diameter of the clamp in the tightened position is less than 40 mm. As a further alternative, a device intended for use with an outer tube could be used with an inner tube by inserting a shim between the clamp and the inner tube.

Preferably the shield of the locking device for preventing unauthorized retraction of a telescopic prop according to any of the preceding claims surrounds the anti-tamper head of the fastener. More preferably still the shield is in the form of an annular flange situated close to the circumference of the head of the fastener. Shields in accordance with these preferred features will be particularly effective against gripping instruments.

Preferably the fastener comprises a bolt with an anti-tamper head and/or a nut with an anti-tamper head. A suitable anti-tamper head is described in U.S. Pat. No. 4,664,000 which relates to locking wheel nuts. The robust nature of nuts and bolts with anti-tamper heads are particularly suitable to the environment of the construction industry and anti-tamper heads as used in locking wheel nuts are considered ideal.

Preferably the clamp has an at least partially circular cross section and tightening the fastener causes the inner circumference of the partially circular cross section to decrease in order to clamp onto the prop. More preferably, the clamp has a C-shaped cross section. An at least partially circular cross sections serves to spread the clamping force evenly around the outer circumference of the prop and avoid or at least diminish deformation of the tubes.

Alternatively the fastener comprises a first end having an anti-tamper head and a second end for engagement with the outer circumference of a prop and the clamp has an inner surface which is arranged to be urged into engagement with the outer circumference of a prop when the fastener is tightened. This arrangement whereby one end of the fastener engages with the prop allows for a large degree of adjustability of the effective diameter of the clamp.

Preferably in such an arrangement the inner surface of the clamp includes a curved part which is arranged to be urged into engagement with the outer circumference of a prop when the fastener is tightened. A curved part arranged to engage with the prop serves to distribute the clamping force evenly and avoid/diminish deformation.

In another preferred aspect of the invention a locking system is provided comprising a pair of locking devices as described above, the first locking device for attachment around the outer circumference of the outer tube of the telescopic prop and the second device for attachment around the outer circumference of the inner tube of the telescopic prop.

In this case, the first device can be attached to the prop as described above so as to prevent the collar from being undone and the second device can be attached in the same fashion to the inner tube of the prop so as to abut the end of the outer tube of the prop. Although it is highly unlikely that a workman would attempt to retract a locked prop without consulting an authorized person, if the collar has not been done up tightly to hold the pin in place, it is possible that a determined vandal could hammer out the pin and thereby allow the inner tube of the prop to retract into the outer tube. Accordingly the use of a second device to prevent the inner tube from being retracted even if the pin is removed provides a backup against this possibility.

BRIEF DESCRIPTION OF THE DRAWINGS

Further aspects of the invention may be understood from the following non-limiting description of two preferred embodiments, in which.

DETAILED DESCRIPTION

Figure 1:
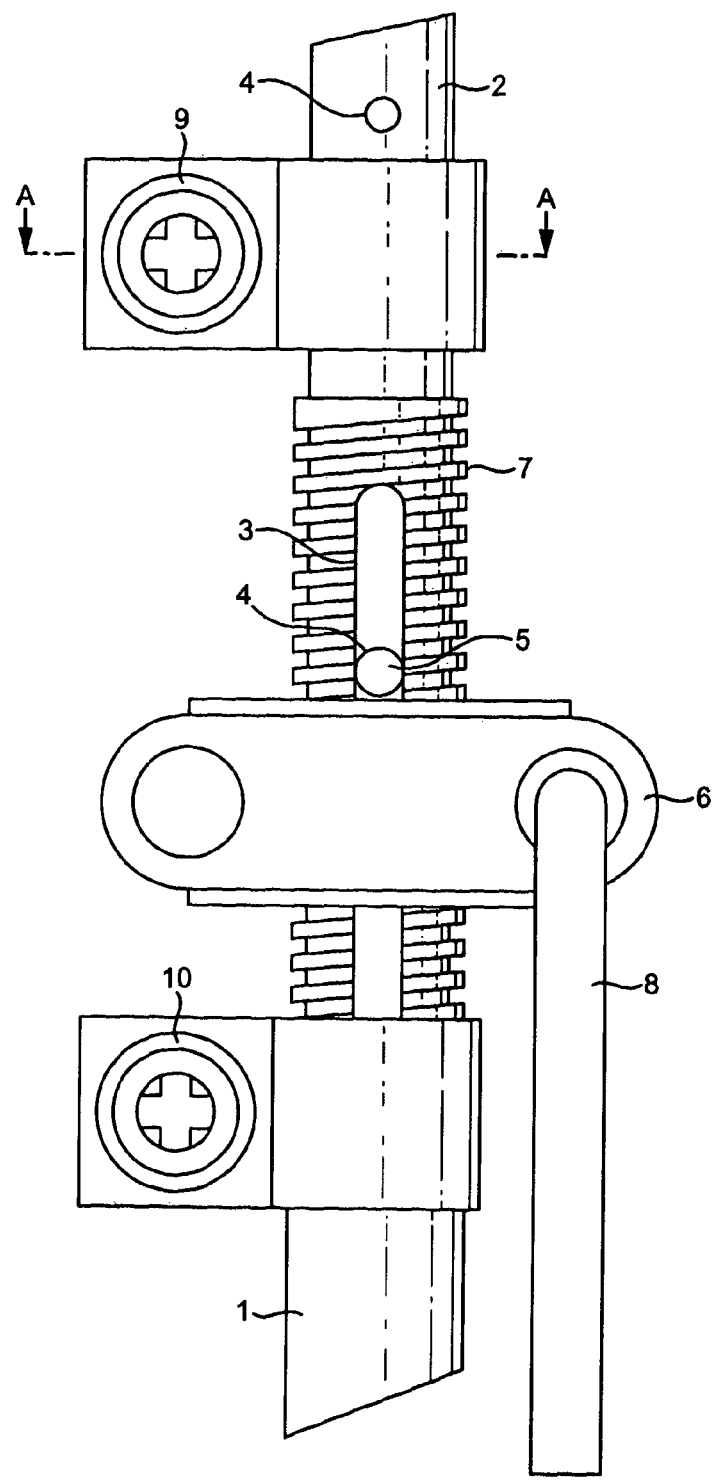
FIG. 1 shows a side elevation of a first embodiment of the invention attached to an adjustable telescopic prop.
Figure 2:
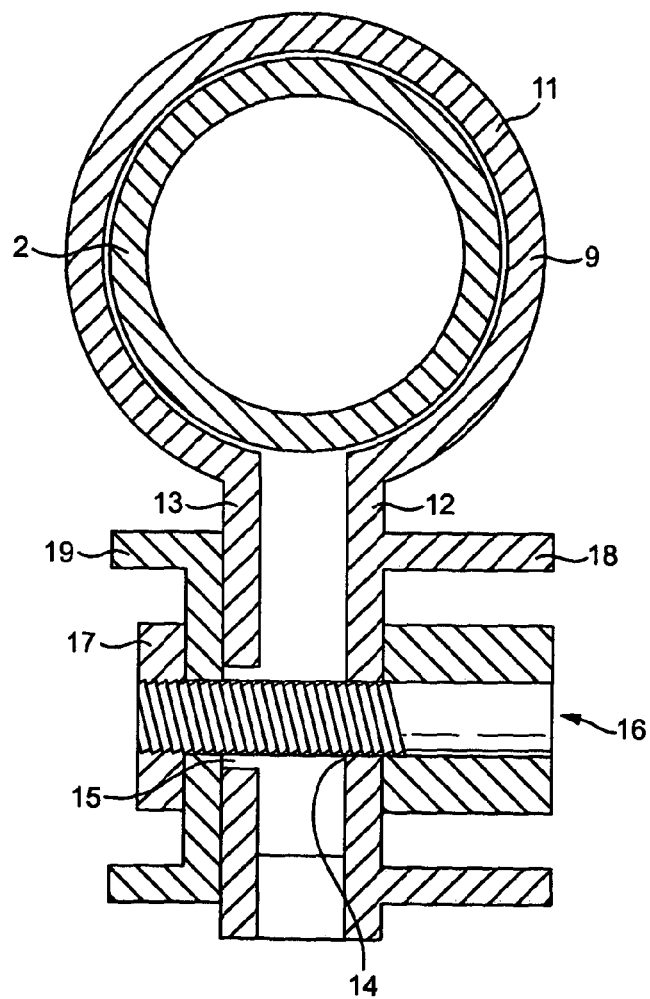
FIG. 2 shows a cross section of the embodiment of the invention show in FIG. 1 along the line A-A.
Figure 3:
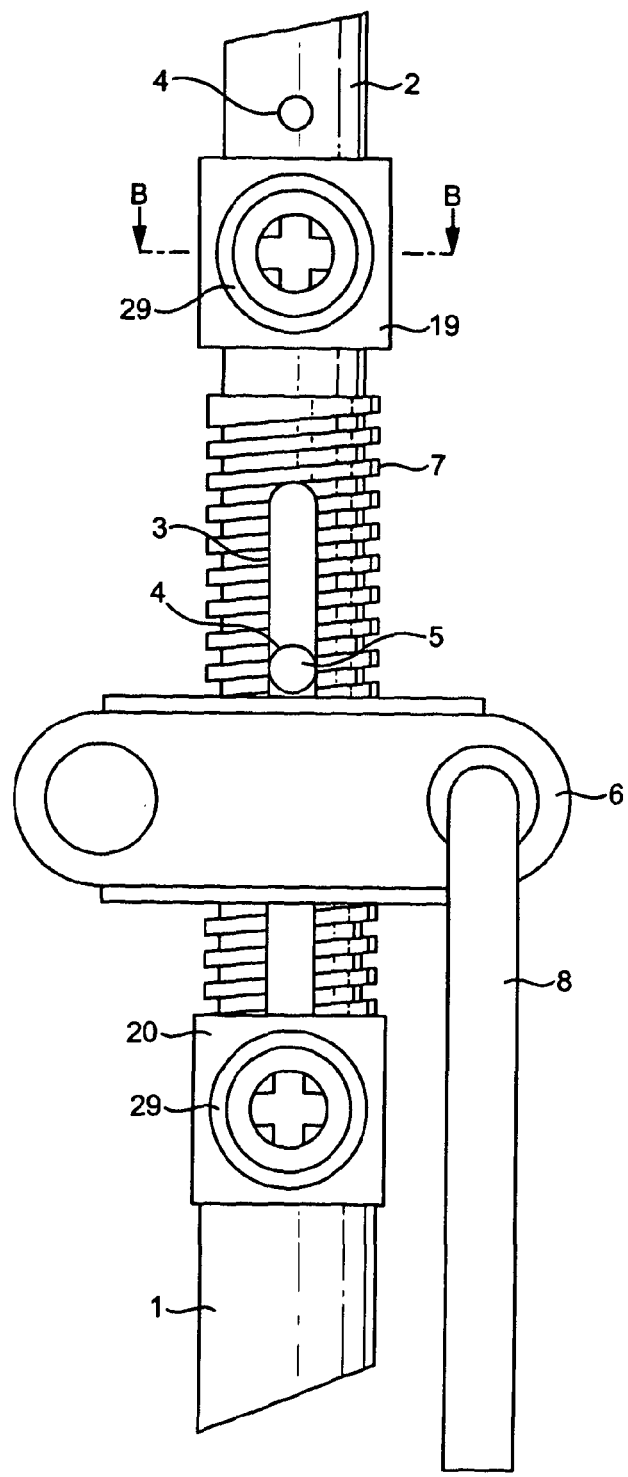
FIG. 3 shows a side elevation of a second embodiment of the invention attached to an adjustable telescopic prop.

Common to all of FIGS. 1 to 4, but best shown in FIGS. 1 and 3 is a conventional adjustable telescopic prop. As mentioned above, the telescopic prop is formed of an outer tube 1 and an inner tube 2. The inner tube 2 can slide telescopically within the outer tube 1 in order to adjust the length of the prop. The outer tube 1 is provided with opposing longitudinal slots 3 and the inner tube 2 is provided with a corresponding series of pairs of opposing holes 4 along its length. A pin 5 is placed through the slots 3 and holes 4 that line up with the slot 3. A collar 6 with a thread (not shown) on its inner surface engages with a thread 7 on the outer surface of the outer tube 1. The collar 6 abuts the pin 5 and as mentioned above movement of the collar 6 along the outer tube 1 urges the pin 5 along the slot 3 to extend the inner tube 2, thereby lengthening the prop (the prop can be shortened by moving the collar 6 in the opposite direction, allowing the pin 5 to move in the opposite direction so that the inner tube 2 is retracted into the outer tube 1). The collar 6 includes a pivotable handle 8 which acts as a lever to assist in turning the collar 6.

Inner tube 2 and outer tube 1 are typically formed from 2-3 mm thick steel and have an inner tube 2 diameter of around 40-50 mm and an outer tube 1 diameter of around 50-60 mm although specifications outside this range are available.

Two locking devices according to the first embodiment of the invention are shown in FIG. 1; an upper locking device 9 and a lower locking device 10. They could also be manufactured from steel, although alternative materials are conceivable. FIG. 2 shows the upper locking device 9 in more detail, but the features of the upper and lower devices 9,10 are the same and therefore the same numbering is used for each. Each locking device 9, 10 is made up of an adjustable clamp 11 which may be formed from a strip of metal shaped so as to extend round the respective inner tube 2 or outer tube 1. The adjustable clamp 11 is therefore C-shaped in cross section with a tubular shape, but with a longitudinal gap between two ends of the strip. At one opposing end of the strip a first tongue 12 extends laterally away from the axis. Likewise at the other opposing end of the strip another tongue 13 extends laterally away from the axis facing the first tongue.

When the tongues 12, 13 are brought closer together the diameter of the C-shaped tubular clamp 11 is reduced so it clamps onto the inner tube 2 or outer tube 1. In order to bring the tongues 12, 13 together, they are provided with opposing apertures 14, 15 through which fastener in the form of a bolt 16 extends.

The head of bolt 16 is shown in FIG. 1 with a cross-shaped head, however this is just for simple illustration in practice it be formed with an anti-tamper head that can only be undone with a correspondingly shaped anti-tamper key (not shown). Exemplary head and key shapes are shown in U.S. Pat. No. 4,664,000 but various alternatives are known, particularly in the field of locking wheel nuts. A nut 17 is shown opposing the bolt 16, but it will be clear to the skilled man that the thread could equally be provided in whichever tongue 13 opposes the bolt 16.

The tongue 12 against which the head of the bolt 16 lies also includes a shield 18 in the form of an annular flange extending away from plane of the tongue 12 so as to surround the bolt 16 and thereby prevent access by a gripping tool so that such a tool cannot be used to grip the outer circumference of the bolt and undo it. In this embodiment a similar shield 19 for the nut 17 is provided on the tongue 13 against which the nut 17 is attached. The nut 17 in this embodiment is provided with an anti-tamper head. Alternatively, as the skilled man will appreciate, it could be welded or otherwise permanently attached to the tongue 13 that it abuts.

In use the upper locking device 9 is slid over the inner tube 2 of a prop so that the inner circumference of the adjustable clamp 11 surrounds the outer circumference of the inner tube 2. Similarly the lower locking device 10 is slid over the outer tube 1 so that the inner circumference of its adjustable clamp surrounds the outer circumference of the outer tube 1. This may be achieved by disassembling the prop so that the inner tube 2 and outer tube 1 are entirely separated and removing the collar 6 from the outer tube 1. The prop is then reassembled with the inner tube 2 retracted inside the outer tube 1.

The prop, with the locking devices 9, 10 in place is then erected as described above, by extending the inner tube 2 into roughly the desired position, placing the pin 5 through the slots 3 in the outer tube 1 and holes 4 in the inner tube 2, then turning the collar 6 to finely adjust the overall length of the prop into its final position.

Once the prop is in its final position, lower locking device 10 is slid up the prop such that the upper surface of the lower locking device 10 is brought into engagement with the lower surface of the collar 6, whereby the collar 6 is sandwiched between the pin 5, which abuts its upper surface, and the lower locking device 10 which abuts its lower surface. Similarly the upper locking device 9 is slid down the inner tube 2 such that its lower surface abuts the upper surface of the outer tube 2 (at the point where the inner tube 2 extends out of the outer tube 1).

The locking devices 9, 10 are locked in position in the same way, i.e. a key corresponding to the anti-tamper head of the bolt 16 is engaged with the bolt 16 and a similar key is engaged with the anti-tamper head of the nut 17, the keys are then turned in order to screw the bolt 16 into the nut 17. This screwing action brings the tongues 12, 13 closer together and reduces the inner diameter of the clamp 11 such that it is tightly clamped onto the respective outer tube 1 or inner tube 2. The key is then removed from the anti-tamper head and kept by an authorized person.

With the lower locking device 9 tightly clamped to the outer tube 1, the collar 6 cannot be undone to retract the prop and release the pin 5. With the upper locking device 10 tightly clamped to the inner tube 2, even if the pin 5 was hammered out, the inner tube 2 cannot be retracted into the outer tube 1 because the lower surface of the upper locking device 10 is in abutment with the end of the outer tube 1.

The keys may be provided as the heads of a spanner or like tool, or may have one end that fits into the nut 16 or bolt 17 and another end which can be turned by a standard spanner or like tool.

Figure 4:
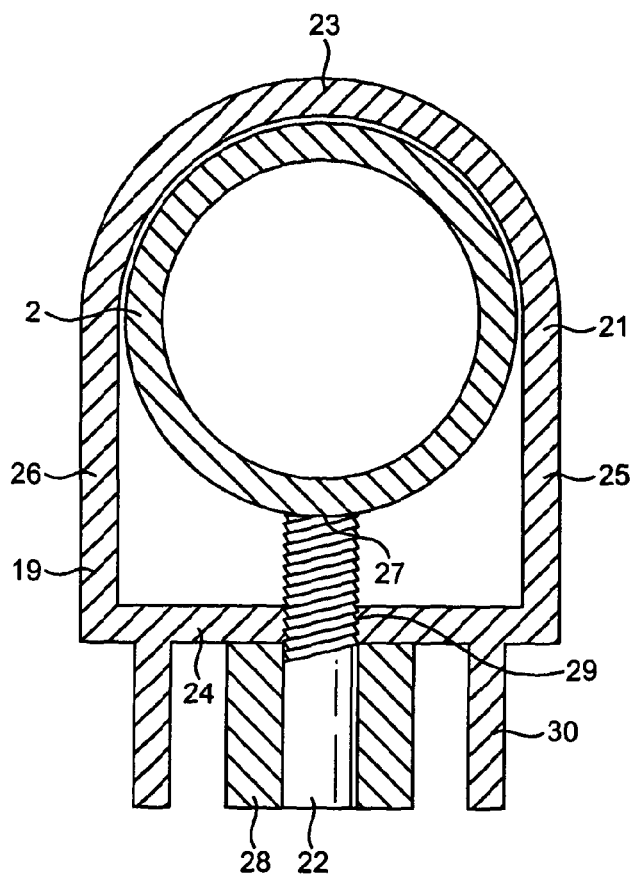
FIG. 4 shows a cross section of the embodiment of the invention show in FIG. 3 along the line B-B.

The second embodiment of the invention is shown in FIGS. 3 and 4 along with the same type of adjustable telescopic prop as described with reference to FIGS. 1 and 2 (the same numbering is used for the adjustable telescopic prop and no further description will be given).

In the second embodiment of the invention, again two locking devices are shown; an upper locking device 19 and a lower locking device 20. Again both locking devices include the same features so the same numerals are used for both and only the upper locking device is shown in detail in FIG. 4. Again each locking device 19, 20 comprises an adjustable clamp which in this case is formed by a tubular sheath 21 and the fastener 22.

The tubular sheath has a D-shaped cross section i.e. generally an elongated semicircle, with a curved part 23 and a flat side 24 but with additional straight edges 25, 26 in between the curved part 23 and the flat side 24, and can be fitted round the outer circumference of the prop. The fastener 22 is provided for tightening the clamp and does so by directly abutting the prop such that the prop is clamped between the end 27 of the fastener 22 and the curved part 23 of the sheath 21. Accordingly, the fastener 22 which as in the first embodiment is in the form of a bolt with an anti-tamper head 28 is arranged to extend through a threaded aperture 29 in the flat side of the tubular sheath 21.

As in the first embodiment, a shield 30 is provided on the clamp to prevent access with a gripping tool to the sides of the anti-tamper head 28. In this embodiment, because the fastener 22 abuts the flat side 24 of the sheath 21 the shield is situated on the flat side of the sheath. Like the shield of the first embodiment, the shield 30 in the second embodiment takes the form of an annular flange extending from flat surface to surround the anti-tamper head 28 of the fastener 22. Of course it will be appreciated that the shield need not have an annular shape, provided it fulfills the function of preventing access by a gripping tool.

In the drawing of FIG. 4 it appears that the curved portion of the sheath is not abutting the inner tube despite the fastener 22 being fully tightened such that its head abuts the flat side of the sheath. In practice the fastener would have a longer threaded rod, or a shim would be inserted between the inner tube 2 and the curved portion of the sheath 21 to ensure that tightening the anti-tamper head of the fastener 22 clamps the locking device onto the outer circumference of the prop.

In use the second embodiment works in much the same way as the first embodiment. Specifically, the tubular sheath 21 of upper locking device 19 is slid over the inner tube 2 of a prop so that the inner circumference of the curved part 23 of the adjustable clamp lies against the outer circumference of the inner tube 2 and the lower locking device 20 is slid over the outer tube 1 so that the inner circumference of its curved part 23 lies against the outer circumference of the outer tube 1. Again, this may be achieved by disassembling the prop so that the inner tube 2 and outer tube 1 are entirely separated and removing the collar 6 from the outer tube 1. The prop is then reassembled with the inner tube 1 retracted inside the outer tube 2.

The prop, with the locking devices 9, 10 in place is then erected as described above, by extending the inner tube 2 into roughly the desired position, placing the pin 5 through the slots 3 in the outer tube 1 and holes 4 in the inner tube 2, then turning the collar 6 to finely adjust the overall length of the prop into its final position.

Once the prop is in its final position, lower locking device 20 is slid up the prop such that the upper surface of the lower locking device 20 is brought into engagement with the lower surface of the collar 6, whereby the collar is sandwiched between the pin 5, which abuts its upper surface, and the lower locking device 20 which abuts its lower surface. Similarly the upper locking device 19 is slid down the inner tube 2 such that its lower surface abuts the upper surface of the outer tube 2 (at the point where the inner tube 2 extends out of the outer tube 1).

The locking devices 19, 20 are locked in position in the same way, i.e. a key corresponding to the anti-tamper head 28 of the fastener 22 is engaged with the fastener 22 and the key is then turned in order to screw the bolt 16 through the threaded aperture 29 such that the end 27 of the fastener 22 is urged towards the respective inner tube 2 or outer tube 1. Once the end 27 of the fastener 22 abuts the respective tub; further screwing squeezes the respective tube between the end 27 of the fastener 22 and the curved part 23 of the tubular sheath 24 thus the effective inner diameter of the clamp is reduced and the respective lower locking device 20 or upper locking device 19 is tightly clamped onto the respective outer tube 1 or inner tube 2. The key is then removed from the anti-tamper head 28 and kept by an authorized person.

With the lower locking device 20 tightly clamped to the outer tube 1, the collar 6 cannot be undone to retract the prop and release the pin 5. With the upper locking device 19 tightly clamped to the inner tube 2, even if the pin 5 was hammered out, the inner tube 2 cannot be retracted into the outer tube 1 because the lower surface of the upper locking device 19 is in abutment with the end of the outer tube 1.

Accordingly, unauthorized retraction of the prop is prevented.

Of course, various modifications to the specific embodiments would be possible and may be contemplated by the skilled person after reading this disclosure and the scope of the invention should to be determined by reference to the following claims. For example, it has been suggested that steel would be an appropriate material for manufacture of the locking device, but other materials, such as other metals, for example aluminium could also be used. Likewise, while a curved surface 23 has been suggested in the second embodiment as the inner surface of the clamp which is arranged to be urged into engagement with the outer circumference of a prop when the fastener is tightened, and a curved surface has the benefit of spreading the clamping force over a larger area of the prop, it could be replaced with a straight surface, or a plurality of straight surfaces, such as in the form of a V-shape. Likewise, while the end 27 of the fastener 22 of the second embodiment directly engages with the outer circumference of the prop, it could, as an example, engage via an intermediary, such as a curved plate.

What is claimed is:

1. A locking device for preventing unauthorized retraction of a telescopic prop, the device comprising:
    an adjustable clamp adapted to be fitted around an outer circumference of the telescopic prop;
    a fastener adapted to tighten the clamp, the fastener comprising an anti-tamper head; and a shield configured to prevent access to the head with a gripping instrument, wherein an inner tube of the adjustable telescopic prop is not capable of being retracted with respect to an outer tube of the telescopic prop due to the adjustable clamp preventing such retraction, wherein the outer tube comprises a threaded section on an exterior surface thereof, wherein the outer tube includes a hole for accepting a pin to be fitted therethrough, wherein a collar is threaded onto the threaded section such that an upper surface of the collar abuts the pin, and wherein the locking device is separate from and movable upward and downward with respect to the threaded section such that the adjustable clamp is positional so as to abut against a lower surface of the collar when the upper surface of the collar abuts the pin.

2. The locking device of claim 1, wherein the telescopic prop comprises an adjustable telescopic prop, and wherein the adjustable clamp is adapted to fit around an outer circumference of the outer tube of the adjustable telescopic prop.

3. The locking device of claim 1, wherein the telescopic prop comprises an adjustable telescopic prop, and wherein the adjustable clamp is adapted to fit around an outer circumference of the inner tube of the adjustable telescopic prop.

4. The locking device of claim 1, wherein the adjustable clamp is adapted to be adjustable so as to fit around and tighten onto both the inner and outer tubes of the telescopic prop.

5. The locking device of claim 1, wherein an inner diameter of the adjustable clamp in an open position is at least 40 mm and the inner diameter of the adjustable clamp in a tightened position is less than 60 mm.

6. The locking device of claim 1, further comprising a shim adapted to be placed between the clamp and an inner tube of the telescopic prop.

7. The locking device of claim 1, wherein the shield surrounds the anti-tamper head.

8. The locking device of claim 7, wherein the shield is in the form of an annular flange situated close to a circumference of the head of the fastener.

9. The locking device of claim 1, wherein the fastener comprises a bolt with the anti-tamper head.

10. The locking device of claim 1, wherein the fastener comprises a nut with the anti-tamper head.

11. The locking device of claim 1, wherein the fastener comprises a first end having the anti-tamper head and a second end for engagement with an outer circumference of the telescopic prop, and the adjustable clamp has an inner surface which is arranged to be urged into engagement with the outer circumference of the telescopic prop when the fastener is tightened.

12. The locking device of claim 11, wherein the inner surface of the adjustable clamp includes a curved part which is arranged to be urged into engagement with the outer circumference of the telescopic prop when the fastener is tightened.

13. A locking system comprising:
first and second locking devices configured to prevent unauthorized retraction of a telescopic prop,
wherein each of the first and second locking devices comprises:
an adjustable clamp adapted to be fitted around the outer circumference of the prop;
a fastener adapted to tighten the clamp, the fastener comprising an anti-tamper head; and
a shield configured to prevent access to the head with a gripping instrument,
wherein the first locking device is adapted for attachment around an outer circumference of an outer tube of a telescopic prop, and the second device is adapted for attachment around an outer circumference of an inner tube of the telescopic prop,
wherein the first locking device is disposed at a first position on the outer tube of the telescopic prop that abuts a portion of a collar that is furthest away from the inner tube of the telescopic prop, and
wherein the second locking device is disposed at a second position on the inner tube of the telescopic prop such that the second locking device contacts a topmost portion of the outer tube of the telescopic prop.

14. The locking device of claim 1, wherein the collar is sandwiched between the adjustable clamp and the pin to thereby prevent the telescopic prop from being retracted.

* * * * *